(12) United States Patent  (10) Patent No.: US 7,664,673 B1
Haughwout  (45) Date of Patent: Feb. 16, 2010

(54) SMART TRANSFER

(75) Inventor: Jim Paul Haughwout, Falls Church, VA (US)

(73) Assignee: AOL LLC, Dulles, VA (US)

( * ) Notice: Subject to any disclaimer, the term of this patent is extended or adjusted under 35 U.S.C. 154(b) by 722 days.

(21) Appl. No.: 09/819,899

(22) Filed: Mar. 29, 2001

Related U.S. Application Data

(60) Provisional application No. 60/233,637, filed on Sep. 18, 2000.

(51) Int. Cl.
G06Q 30/00 (2006.01)

(52) U.S. Cl. .............. 705/26; 705/27; 379/265.01; 379/265.1; 379/265.11; 379/265.13; 379/266.01; 379/266.02

(58) Field of Classification Search ........... 705/26, 705/27, 7, 10, 14; 455/466, 456.1; 379/88.19, 379/88.22, 265.12, 265.09, 265.01, 265.11, 379/266.01, 265.13, 266.02
See application file for complete search history.

(56) References Cited

U.S. PATENT DOCUMENTS

| | | | |
|---|---|---|---|
| 5,511,112 A * | 4/1996 | Szlam | 379/266.06 |
| 5,590,128 A | 12/1996 | Maloney et al. | |
| 5,594,791 A * | 1/1997 | Szlam et al. | 379/265.09 |
| 5,684,870 A * | 11/1997 | Maloney et al. | 379/212.01 |
| 5,701,340 A | 12/1997 | Zwick | |
| 5,768,360 A * | 6/1998 | Reynolds et al. | 379/211.02 |
| 5,774,668 A | 6/1998 | Choquier et al. | |
| 5,822,410 A * | 10/1998 | McCausland et al. | 379/114.01 |
| 5,870,744 A | 2/1999 | Sprague | |
| 5,884,312 A | 3/1999 | Dustan et al. | |
| 5,933,811 A * | 8/1999 | Angles et al. | 705/14 |
| 5,937,037 A * | 8/1999 | Kamel et al. | 379/88.19 |

(Continued)

FOREIGN PATENT DOCUMENTS

WO  WO 98/56154  12/1998
WO  WO 00/35216  6/2000

OTHER PUBLICATIONS

Marriott, Michel, "Online Stores Hope Shoppers Say Aye to Watchful Asssitants", Sun Sentinel, Fort Lauderdale, Feb. 20, 2000, 1 page.*
*Geotel provides Enterprise wide Call Centre Solutions*, Niels Kjellerup, Competitor Brief, Sep. 5, 1998 Datamonitor (15 pages).

*Primary Examiner*—F. Zeender
*Assistant Examiner*—M. Thein
(74) *Attorney, Agent, or Firm*—Fish & Richardson P.C.

(57) ABSTRACT

A first sales pitch appropriate for a particular telephone caller of a telephone call center may be selected by receiving a call from a caller to the telephone call center, accessing information about the caller including an indication of past misbehavior or a sales pitch preference of the caller that includes a preference not to receive one or more undesired sales pitches, and automatically selecting the first sales pitch based upon the sales pitch preference of the caller, for example, if there is no indication of past misbehavior. The call may be transferred to a human operator, and the human operator may be assisted in presenting the first sales pitch to the caller, for example, by displaying at least a portion of the first sales pitch to the human operator.

31 Claims, 12 Drawing Sheets

U.S. PATENT DOCUMENTS

| | | | | |
|---|---|---|---|---|
| 5,963,635 A * | 10/1999 | Szlam et al. | | 379/309 |
| 6,070,142 A * | 5/2000 | McDonough et al. | | 705/7 |
| 6,070,192 A | 5/2000 | Holt et al. | | |
| 6,134,315 A * | 10/2000 | Galvin | | 379/219 |
| 6,134,530 A * | 10/2000 | Bunting et al. | | 705/7 |
| 6,181,927 B1 * | 1/2001 | Welling et al. | | 455/414.1 |
| 6,366,661 B1 | 4/2002 | Devillier et al. | | |
| 6,389,400 B1 * | 5/2002 | Bushey et al. | | 705/7 |
| 6,470,453 B1 | 10/2002 | Vilhuber | | |
| 6,477,559 B1 | 11/2002 | Veluvali et al. | | |
| 6,553,113 B1 * | 4/2003 | Dhir et al. | | 379/265.02 |
| 6,665,644 B1 * | 12/2003 | Kanevsky et al. | | 704/275 |
| 2001/0014868 A1 * | 8/2001 | Herz et al. | | 705/14 |
| 2002/0077130 A1 * | 6/2002 | Owensby | | 455/466 |

\* cited by examiner

| Caller Information Data Field | Caller Information | SALES PITCH PROFILE #1 | Match? |
|---|---|---|---|
| | | Match Criteria | |
| Caller Preference | no preferences | partner C products or services | yes |
| History of Past Pitches Presented | • partner A - long distance<br>• partner B - magazines<br>• presenter - online account upgrade | no prior pitch to caller regarding wireless service provided by partner C | yes |
| History of Services or Products Purchases from Pitch Presenter or Partners | • presenter - online account upgrade<br>• partner B - subscribed to music club | any | yes |
| Listing of Services or Products Currently Enrolled in by Caller | • presenter - online account upgrade | no current enrollment in wireless service offered by partner C | yes |
| History of Caller Behavior | no misbehavior | no misbehavior | yes |
| Credit Status of Caller | AAA+ | AAA or better | yes |
| Account Information | | | |
| • account type | platinum | any | yes |
| • account status | delinquent | paid up | no |
| • method of payment | credit card | credit card | yes |
| Caller Demographic Information | | | |
| • sex | F | any | yes |
| • age | 28 | 18 or greater | yes |
| • marital status | M | any | yes |
| • place of residence | Durham, NC | United States | yes |
| • profession | financial analyst | any | yes |
| • avocation(s) | scuba, music, stock market | any | yes |

FIG 7A

|  | | 700B | 715B |
|---|---|---|---|
| Caller Information Data Field | Caller Information | SALES PITCH PROFILE #2 | Match? |
| | | Match Criteria | |
| Caller Preference | no preferences | partner C products or services | yes |
| History of Past Pitches Presented | • partner A - long distance<br>• partner B - magazines<br>• presenter - online account upgrade | no prior pitch to caller regarding upgraded wireless coverage provided by partner C | yes |
| History of Services or Products Purchases from Pitch Presenter or Partners | • presenter - online account upgrade<br>• partner B - subscribed to music club | any | yes |
| Listing of Services or Products Currently Enrolled in by Caller | • presenter A - online account upgrade | no current enrollment in upgraded wireless coverage offered by partner C | yes |
| History of Caller Misbehavior | no misbehavior | no misbehavior | yes |
| Credit Status of Caller | AAA+ | AAA or better | yes |
| Account Information | | | |
| • account type | platinum | any | yes |
| • account status | delinquent | paid up | no |
| • method of payment | credit card | check | no |
| Caller Demographic Information | | | |
| • sex | F | any | yes |
| • age | 28 | 18 or greater | yes |
| • marital status | M | single | no |
| • place of residence | Durham, NC | United States | yes |
| • profession | Financial Analyst | any | yes |
| • avocation(s) | scuba, music, stock market | any | yes |

| Caller Information Data Field | Caller Information | SALES PITCH PROFILE #3 Match Criteria | Criteria Weight | Match? /Match Value | Weighted Match Value |
|---|---|---|---|---|---|
| Caller Preference | Prefer to not receive any sales pitches | not adverse to partner C products or services | 20 | no/-1 | -20 |
| History of Past Pitches Presented | • partner A - long distance<br>• partner B - magazines<br>• presenter - online account upgrade | no prior pitch to caller regarding wireless service provided by partner C | 2 | yes/1 | 2 |
| History of Services or Products Purchases from Pitch Presenter or Partners | • presenter - online account upgrade<br>• partner B - subscribed to music club | any | 0 | yes/1 | 0 |
| Listing of Services or Products Currently Enrolled in by Caller | • presenter - online account upgrade<br>• partner C - wireless service | no current enrollment in wireless service offered by partner C | 10 | no/-1 | -10 |
| History of Caller Misbehavior | no misbehavior | no misbehavior | 0 | yes/1 | 0 |
| Credit Status of Caller | AAA+ | AAA or better | 2 | yes/1 | 2 |
| Account Information | | | | | |
| • account type | platinum | silver - platinum | 1 | yes/1 | 1 |
| • account status | delinquent | paid up | 2 | yes/1 | -2 |
| • method of payment | credit card | any | 0 | yes/1 | 0 |
| Caller Demographic Information | | | | | |
| • sex | F | any | 0 | yes/1 | 0 |
| • age | 28 | 18 or greater | 10 | yes/0 | 0 |
| • marital status | M | any | 0 | yes/1 | 0 |
| • place of residence | Durham, NC | United States | 10 | yes/0 | 0 |
| • profession | financial analyst | any | 0 | yes/1 | 0 |
| • avocation(s) | scuba, music, stock market | any | 0 | yes/1 | 0 |

Profile Correlation Value: -27

FIG 8

| SALES PITCH LOOK-UP TABLE ||
| Sales Pitch Profile | Sales Pitch |
| Profile_1 | Profile_1 |
| Profile_2 | Profile_2 |
| Profile_3 | Profile_3 |
| ... | ... |
| Profile_n-1 | Profile_n-1 |
| Profile_n | Profile_n |

| PARTNER | PROGRAM | DISTRIBUTION (within Partner) | SCRIPT | |
|---|---|---|---|---|
| Internal (25% of Total) | Sign On a Friend | 100% | "I would like to let you know that we will give you $50 every time you sign on a friend or family member before April 30th. This will assist you in adding more friends and family to your Talk list and in keeping in touch. We'll be happy to mail out a 500-hour Free trial disc of our Latest Software to your friend or family member. Once that friend or family member has been a member for 90days, we'll mail you a check for $50!<br><br>Who do you have in mind?<br><br>If NO: "OK, Happy we were able to assist today."<br><br>If YES: "Great, I'll just process this order for the Free Trial Software to be mailed out immediately. Who else would you like us to send a Free Trial Software package to?"<br><br>Thank you and have a great day." | ← 1005 |
| Partner A (35% of Total) | Voyagers' Edge | 70% | "Before I let you go, I want you to know that we have arranged for you to receive a Getaway Weekend and a free trial membership in our Voyagers' Edge program. May I connect you for more details?"<br><br>If YES: "Great, I'll transfer you now." | ← 1010 |
| | Emerald Vista | 30% | "Before I let you go, I want you to know that we have arranged for you to receive a Free Personal Electronic Organizer and a free trial membership in our Emerald Vista program. May I connect you for more details?" | ← 1015 |
| Partner B (30% of Total) | Long Distance Service | 100% | "For being a valued Member you are eligible TO EARN UP TO THREE MONTHS OF our Service for trying an exclusive member benefit. What I'm going to do is bring someone on the line who can give you all of the details... OK?"<br><br>If YES: "Great, I'll transfer you now." | ← 1020 |
| Partner C (10% of Total) | Magazine Trial | 100% | "Because you are a valued customer, we've arranged for you to try up to 2 magazines free for 2 months. You can choose from Entertainment by the Minute, Wealth, The Beautiful and The Famous, Athletics Illuminated, or Epoch"<br><br>If YES: "May I connect you for more information?" | ← 1025 | fig 10

SMART TRANSFER

This application claims priority from U.S. Provisional Application No. 60/233,637 titled "Smart Transfer" and filed Sep. 18, 2000, which is incorporated by reference.

TECHNICAL FIELD

This invention relates to selecting a sales pitch for a telephone caller.

BACKGROUND

Advances in information technology have enhanced the ability of organizations to effectively offer services through telephone call centers. At the same time, the volume of individuals wishing to interact with various organizations has motivated those organizations to channel incoming calls through new or expanded telephone call centers. As a result, the number of incoming calls seeking information or assistance from telephone call centers has increased significantly. These incoming calls represent a financial opportunity on which the telephone call centers of many organizations strive to capitalize by marketing various services and products to their callers during incoming calls.

SUMMARY

In one general aspect, a first sales pitch appropriate for a particular telephone caller is selected by receiving a call from a caller, accessing information about the caller based on information gathered about the caller prior to the call, and automatically selecting a first sales pitch for the caller based upon the information accessed about the caller.

Implementations may include one or more of the following features. For example, the first sales pitch may be selected automatically only when the information accessed about the caller indicates that the caller satisfies certain predetermined criteria. For example, a sales pitch may not be selected for a caller where the information accessed about the caller indicates an unsatisfactory credit status, or a caller preference to not receive any sales pitches. Moreover, a sales pitch may be made unavailable for selection for a caller based upon a geographic region of residence of the caller that is indicated in the information accessed about the caller.

Accessing information about the caller may include acquiring and storing information about the caller before receiving the call from the caller. Information also may be assessed automatically upon receiving the call from the caller.

The information accessed about the caller may include historical information based on the caller's responses to past sales pitch offers. For example, the selected first sales pitch may be presented to the caller and information reflecting a response of the caller to the first sales pitch may be acquired and stored as part of the information about the caller. The acquisition and storage of the information reflecting the response of the caller may occur immediately after the caller provides the response to the first sales pitch.

The information about the caller also may include, for example, information regarding enrollment by the caller in products or services offered by a commercial partner, or a name, an address, or a telephone number associated with the caller. Other examples include a credit status of the caller and or information concerning a preference of the caller with respect to sales pitches.

The first sales pitch may be selected automatically, for example, by automatically determining a pool of available sales pitches for the caller including all sales pitches for which the caller has not been indicated ineligible by the information accessed about the caller. A sales pitch may be randomly selected from the available pool. If the information accessed about the caller indicates that the caller is ineligible for the sales pitch, the sales pitch is removed from the pool of available sales pitches and another sales pitch is randomly selected. This process may be continued until random selection results in a sales pitch (e.g., the first sales pitch) for which the information about the caller indicates the caller is eligible.

An equal or uniform probability of selection may attach to each sales pitch in the pool of available sales pitches. Alternatively, the probability of selection may be non-uniform. For example, the pool of available sales pitches may include sub-pools of available sales pitches. Each sub-pool may be associated with a different probability defining the likelihood that a sales pitch will be selected from the sub-pool of sales pitches in a given random selection.

Automatically selecting the first sales pitch also may include automatically determining a pool of available sales pitches for the caller that includes only those sales pitches for which the caller is eligible as indicated by the information accessed about the caller. The first sales pitch may be randomly selected from the pool of available sales pitches.

Alternatively, for example, the first sales pitch may be automatically selected by automatically comparing the information accessed about the caller to a sales pitch profile associated with a sales pitch to generate a comparison result. A sales pitch profile having an acceptable comparison result may be identified and a sales pitch associated with the sales pitch profile may be selected as the first sales pitch.

Automatically selecting the first sales pitch also may include accessing a stored relationship between products and services of one commercial partner to sales pitches corresponding to products and services of another commercial partner.

A second sales pitch may be selected for the caller immediately after the caller provides the response to the first sales pitch. The second sales pitch may be selected automatically based upon the information accessed about the caller including the information reflecting the response of the caller to the first sales pitch.

The caller also may be transferred to a commercial partner after the caller provides a response to the first sales pitch. In such a case, information accessed about the caller may be communicated to the commercial partner substantially in real time. The communicated information about the caller may include, for example, a name, an address, and a telephone number associated with the caller as well as information regarding the response of the caller to the first sales pitch presented to the caller.

The commercial partner to which the caller is transferred may provide a good or service that corresponds to the selected first sales pitch and may provide a second sales pitch to the caller. Feedback may be received from the commercial partner regarding a response of the caller to the second sales pitch and may be stored as part of the information accessed about the caller. The commercial partner may provide the feedback almost immediately after receiving the response of the caller to the second sales pitch.

These general and specific aspects may be implemented using a method, a system, or a computer program, or any combination of systems, methods, and computer programs.

DESCRIPTION OF DRAWINGS

FIGS. 7A and 7B are tables illustrating a sample of non-mutually exclusive sales pitch profiles and their relationship to caller information such as the caller information illustrated by FIG. 3.

FIG. 8 is a table illustrating a process for calculating a profile correlation value that may be used in implementing the process of FIG. 6.

FIG. 10 is a table illustrating sales pitches that may be accessed using the look-up table of FIG. 9 and also a probability distribution associated with the selection of the sales pitches.

Like reference symbols in the various drawings indicate like elements.

DETAILED DESCRIPTION

For illustrative purposes, a process is described for selecting a sales pitch for an incoming caller, and systems and software for implementing the process also are described. For clarity of exposition, the description proceeds from an account of general elements of the process, systems implementing the process, and their high level relationship, to a detailed account of illustrative roles, configurations, and components of the elements.

Figure 1:
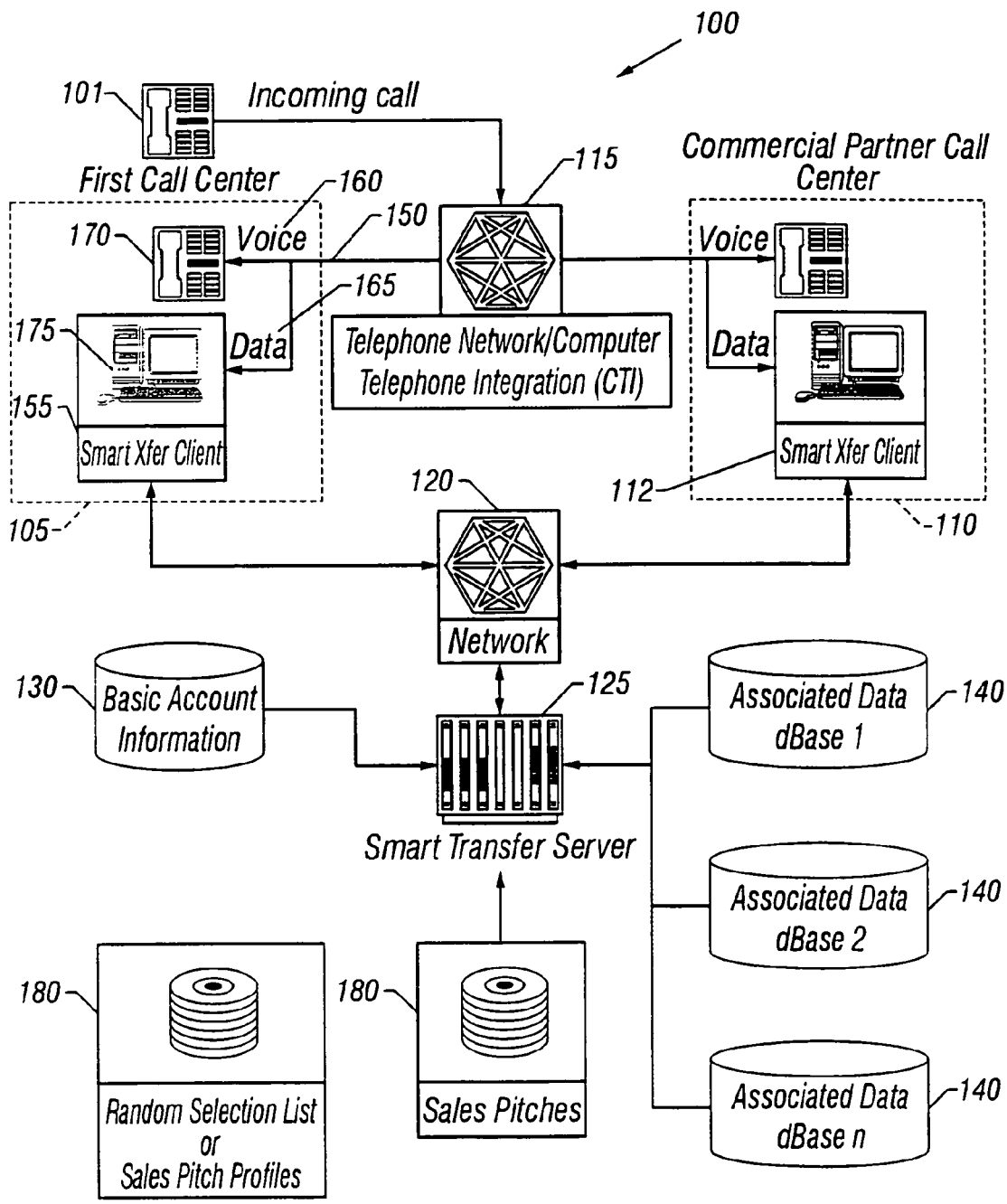
FIG. 1 is a is a schematic diagram of a system configured to select automatically an acceptable sales pitch for a caller.

Referring to FIG. 1, a generalized system 100 may be used to select and present an appropriate sales pitch to a telephone caller 101. The exemplary components of the system 100 are described in greater detail below.

The system 100 of FIG. 1 may include a first call center 105 and a commercial partner call center 110. The call centers 105, 110 may be configured to communicate over a telephone network 115 and to receive calls through the telephone network 115 such as, for example, calls from the caller 101. The first call center 105 and the commercial partner call center 110 also may be configured to communicate over a computer network 120 with a smart transfer server 125. The smart transfer server 125 may be arranged to communicate with databases 130 and 140 that contain basic account information (database 130) and associated information (databases 140) about the caller 101.

The first call center 105 is capable of receiving both voice and other data through a wired or wireless communication pathway 150 to the telephone network 115. The first call center 105 may include at least one smart transfer client 155 structured and arranged to receive the voice data 160 or the other data 165. The smart transfer client 155 also may include one or more voice communications devices 170 arranged to receive voice communications by way of a voice data pathway. To receive other data, the smart transfer client 155 also may include one or more general-purpose or special-purpose computers (e.g., personal computer 175, personal digital assistants (PDAs), or devices specifically programmed to perform certain tasks such as, for example, communicating with each other and/or the telephone network), or a combination of one or more of these devices. One or more other systems may be included in the smart transfer client 155. For example, the smart transfer client 155 may include one or more Local Area Networks (LANs) and/or one or more Wide Area Networks (WANs). The smart transfer client 155 also may be included as part of another system. Software applications loaded on the smart transfer client 155 may be used to control the response to and execution of instructions received by the smart transfer client 155. Alternatively, or in addition, the response to and execution of instructions received by the smart transfer device 155 may be controlled by, for example, a program, a piece of code, an instruction, a device, a computer system, or a combination thereof, for independently or collectively instructing the smart transfer client 155 to interact and operate as described herein.

The voice communications devices 170 included in the first call center 105 may typically include one or more hardware components and/or software components. Examples of voice communications devices 170 include an analog, a digital, or a cellular telephone, whether wired or wireless, a program, a piece of code, an instruction, a device, a computer, a computer system, or a combination thereof, for independently or collectively sending or receiving voice communications. Implementations of voice communications devices 170 may exist permanently or temporarily in any type of machine, component, physical or virtual equipment, storage medium, or propagated signal capable of sending or receiving voice communications.

The commercial partner call center 110 may be configured in a manner similar to the first call center 105.

Either or both of the telephone network 115 and the computer network 120 may be structured and configured to provide computer telephone integration (CTI) so that voice and/or other data may be communicated over the networks 115, 120. The networks 115, 120 typically allow direct or indirect communication between parties, irrespective of physical separation. The networks 115, 120 may include various mechanisms for delivering voice and/or other data, such as, for example, analog or digital wired and wireless telephone networks, e.g., public switched telephone networks (PSTN), integrated services digital networks (ISDN), all types of digital subscriber lines (xDSL), advance mobile telephone service (AMPS), global system for mobile communications (GSM), or code division multiple access (CDMA). The networks 115, 120 also may include the Internet, the World Wide Web, one or more local area networks (LANs) and/or one or more wide area networks (WANs), radio, cable, satellite, and/or any other delivery mechanism for carrying voice or other data.

The smart transfer server 125 typically is configured to communicate and function together with at least one smart transfer client, e.g., smart transfer client 155. The smart transfer server 125 may include one or more hardware components and/or software components. For example, the smart transfer server 125 may include a general purpose computer (e.g., a personal computer, server, or workstation) capable of responding to and executing instructions in a defined manner. Other examples include a special-purpose computer, a device, a component, other physical or virtual equipment or some combination thereof capable of responding to and executing instructions. The response to and execution of instructions by the smart transfer server 125 may be controlled by a software application loaded on the smart transfer server 125, or, for example, by a program, a piece of code, an instruction, a device, a computer system, or a combination thereof, for independently or collectively instructing the smart transfer server 125 to interact and operate as described herein.

The smart transfer server 125 and the smart transfer client 155 typically include a communication device (not shown) for sending and/or receiving data from the computer network 120. One example of the communication device is a modem. Other examples include a transceiver, a set-top box, a communications card, a satellite dish, an antenna, or another network adapter capable of transmitting data to and/or receiving data from the computer network 120 through a wired or wireless pathway.

The smart transfer server 125 typically is configured to communicate with internal and/or external storage media 180 for storing data and programs. The storage media 180 may include electrical, magnetic, and/or optical storage media. The storage media 180 typically store sales pitches, sales pitch profiles, and/or a random selection list of available sales pitches 195. The sales pitch profiles and the random selection list both may be used to select a sales pitch, for example, using processes described in greater detail with respect to FIGS. 2, 5 and 6.

The smart transfer server 125 is configured and arranged to communicate with at least one first database 130 and at least one second database 140. The first database 130 may be, for example, a relational database, used to store and provide access to basic account information associated with the caller 101. The second database 140 also may be a relational database. The second database 140 generally stores and enables access to information about the caller 101 that is associated with the basic account information. The databases 130 and 140 and the information that they contain, e.g., basic account information and associated information, may reside at any appropriate location (e.g., local location, remote location, third party location), and also may reside on any appropriate storage medium 180 such as, for example, a magnetic disc array, or an optical disk array. These databases 130 and 140 may be contained in a single physical or logical structure, or they may be physically or logically distinct. Additionally, databases 130 and 140 may each form a single database or several interconnected or accessible databases.

Figure 2:
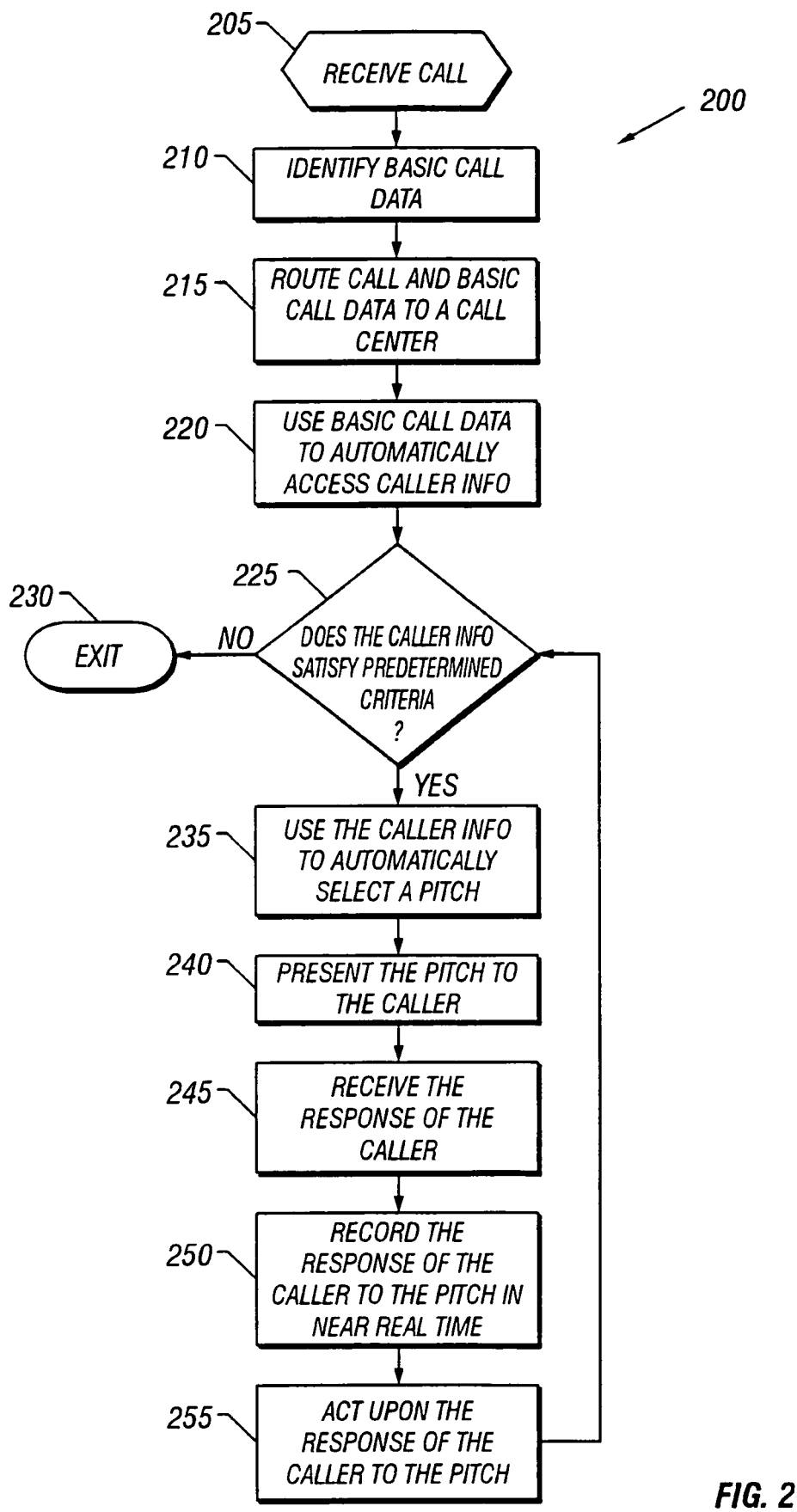
FIG. 2 is a schematic flow diagram illustrating a systematic process implementable by the system of FIG. 1 for selecting automatically an acceptable sales pitch for a caller.

Referring to FIG. 2, a process 200 for selecting a sales pitch for an incoming caller 101 may, be implemented by, for example, the system of FIG. 1. When a call is received (step 205), basic call data associated with the call are identified (step 210). Basic call data may include, for example, a name associated with the caller 101, a telephone number associated with the caller 101, and/or a geographic location of the caller 101. The call and the associated basic call data are routed to a call center (step 215), where stored information about the caller 101 is accessed automatically based on the associated basic call data (step 220), as discussed in detail with respect to FIG. 4.

The stored information about the caller 101 then is used to determine an appropriate subsequent action (step 225). If, for example, the stored information about the caller 101 fails to satisfy predetermined criteria, then no sales pitch is automatically selected for the caller 101 using this process (step 230). However, a sales pitch is automatically selected for the caller 101 using the stored information about the caller 101 (step 235) if the stored information about the caller 101 satisfies the predetermined criteria, as discussed in more detail with respect to FIGS. 5-8.

The selected sales pitch is displayed at the call center and presented to the caller 101 (step 240). The call center receives a response of the caller 101 to the sales pitch (step 245) and information associated with the caller's response to the sales pitch is recorded as part of the stored information about the caller (step 250). The information associated with the caller's response may be recorded substantially in real time (step 250), for example, after receiving the response of the caller (step 245) but before the response is acted upon (step 255) or the telephone call is terminated. Alternatively, the information associated with the caller's response may be recorded immediately after the response has been received and acted upon (this alternative order of events is not shown in FIG. 2). Either case may be contrasted against the delayed batching of accumulated information associated with the responses of a significant numbers of callers. The process described is repeated, beginning at step 225, until the updated stored information about the caller does not satisfy the predetermined criteria and the sales pitch selection process 200 is exited (step 230).

Figure 3:
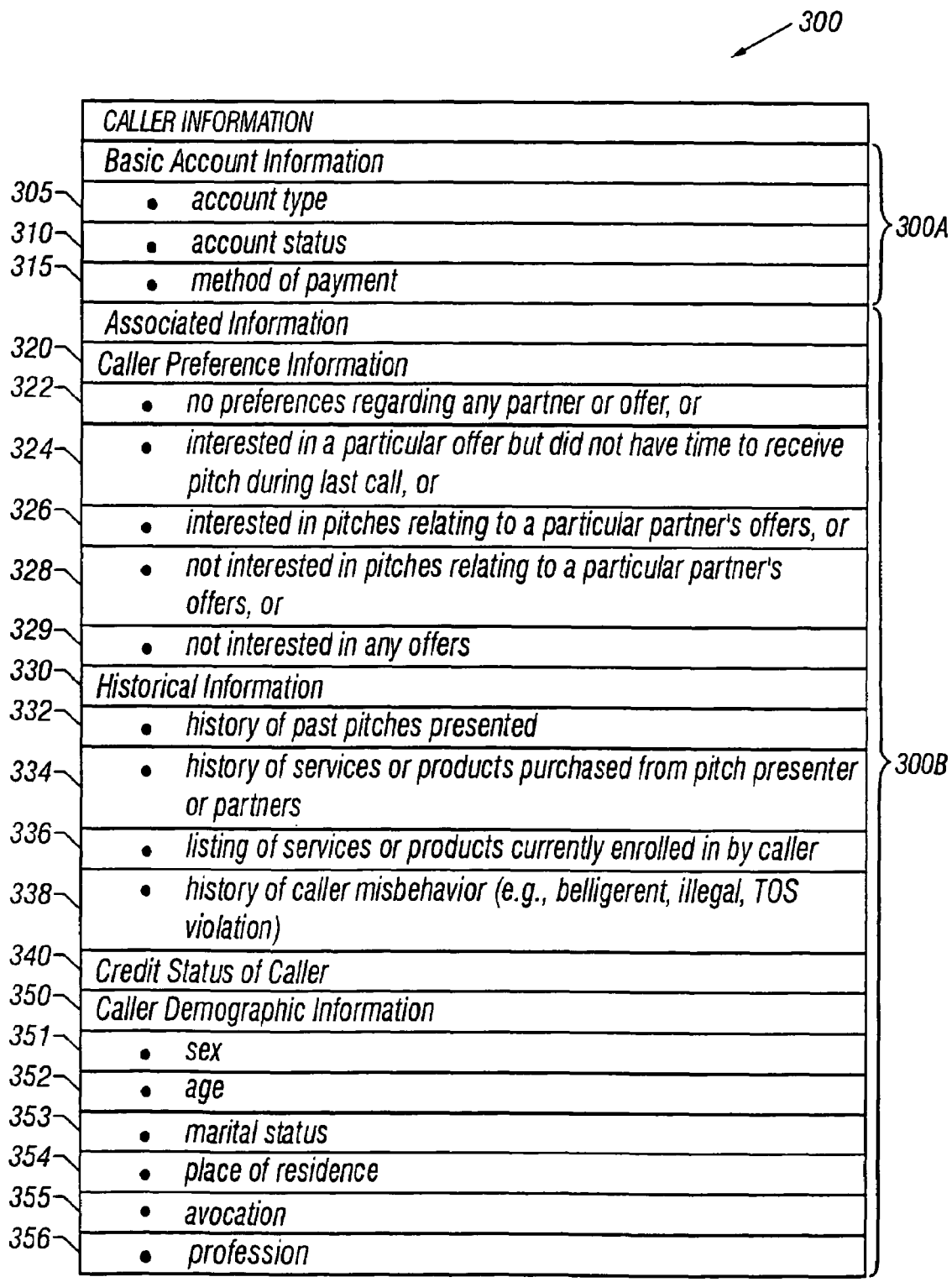
FIG. 3 is a table illustrating examples of caller information accessed in the process of FIG. 2.

Referring to FIG. 3, the information about the caller 300 may include basic account information 300A related to an account of the caller. The basic account information 300A may include, for example, the caller's account type 305 (e.g., Gold, Platinum, overhead, normal, internal), account status 310 (e.g., AAA, AAA+, active, canceled, terminated, delinquent), and payment method 315 (e.g., credit, check, prepaid). The basic account information 300A may be related to a screen name of the caller and may be stored, referring to FIG. 1, in a first database 130.

Referring back to FIG. 3, the information about the caller 300 may include other information 300B associated with the basic account information 300A that may be stored in at least one second database 140. The associated information 300B may include caller preference information 320, such as, for example, information indicating that the caller 101 has no sales pitch preference 322 or that the caller 101 prefers not to receive any sales pitches 329. The caller preference information 320 also may include information 324 indicating that the caller 101 prefers to be presented a particular pitch, previously offered but which the caller 101 was unable to receive at the time of the offer. Additionally, the caller preference information 320 may include information 326 indicating that the caller 101 prefers sales pitches relating to a particular service or product provider's offers, or information 328 indicating that the caller 101 prefers not to receive sales pitches relating to a particular service or product provider's offers. Moreover, the associated information may include historical information 330, such as historical information 332 related to which sales pitches have been presented to the caller 101, the time at which they were presented, and the caller's response to them. The historical information 330 also may include information 334 regarding past services or products purchased from the pitch presenter or its commercial partners, and a listing 336 of services or products offered by the pitch presenter or its commercial partners in which the caller is currently enrolled, whether or not as a result of a sales pitch. Furthermore, the historical information may include information 338 regarding past misbehavior of the caller, such as, for example, information that the caller has behaved belligerently toward a call center operator, information that the caller has behaved illegally (e.g., with respect to a pitched or subscribed product or service), and/or information that the caller has violated a terms of service (TOS) agreement associated with the caller's account. The associated information also may include a credit status 340 of the caller and demographic information 350 related to the caller. The demographic information 350 related to the caller 101 may include, for example, the sex 351, age 352, marital status 353, place of residence 354, avocation 355, and profession 356 of the caller 101.

Figure 4:
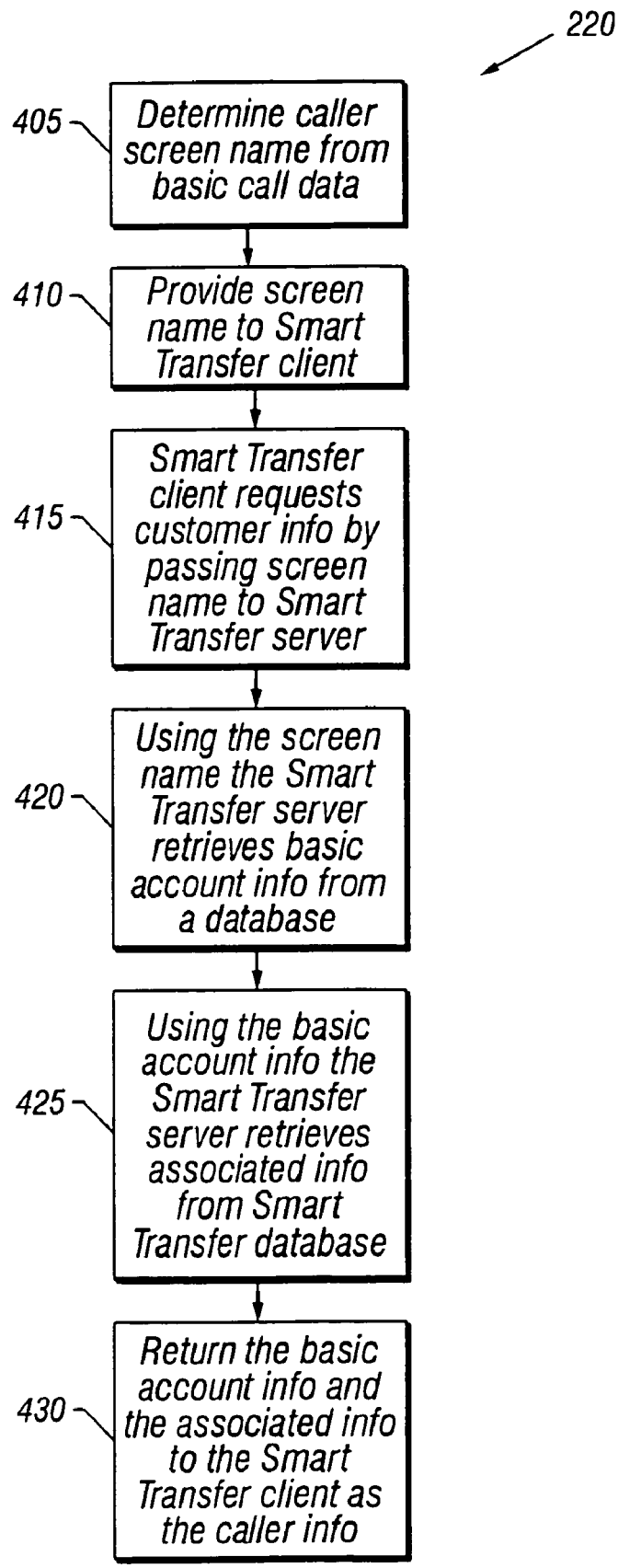
FIG. 4 is a schematic flow diagram illustrating the use of basic call data to access the caller information as provided generally in FIG. 2.

FIG. 4 illustrates a process 220 for automatically accessing information about the caller 300. A screen name associated with the caller 101 may be accessed using the basic call data (step 405). The screen name may be provided to the smart transfer client (e.g., 155 of FIG. 1) (step 410), which may pass the screen name to the smart transfer server (e.g., 125 of FIG. 1) through the network (e.g., 120 of FIG. 1) (step 415). The smart transfer server 125 may use the screen name to access basic account information 300A associated with the screen name from a first database (e.g., 130 of FIG. 1) (step 420). The smart transfer server 125 then may use the accessed basic account information 300A to access the associated information 300B about the caller 101 stored in at least one second database (e.g., 140 of FIG. 1) (step 425). The associated information 300B may include information stored by a third party to the transaction, such as, for example, referring to FIG. 3, a credit status 340 stored by a credit checking agency. The smart transfer server 125 then may return the basic account information 300A and the associated information 300B to the smart transfer client 155 as the information about the caller (step 430).

Figure 5:
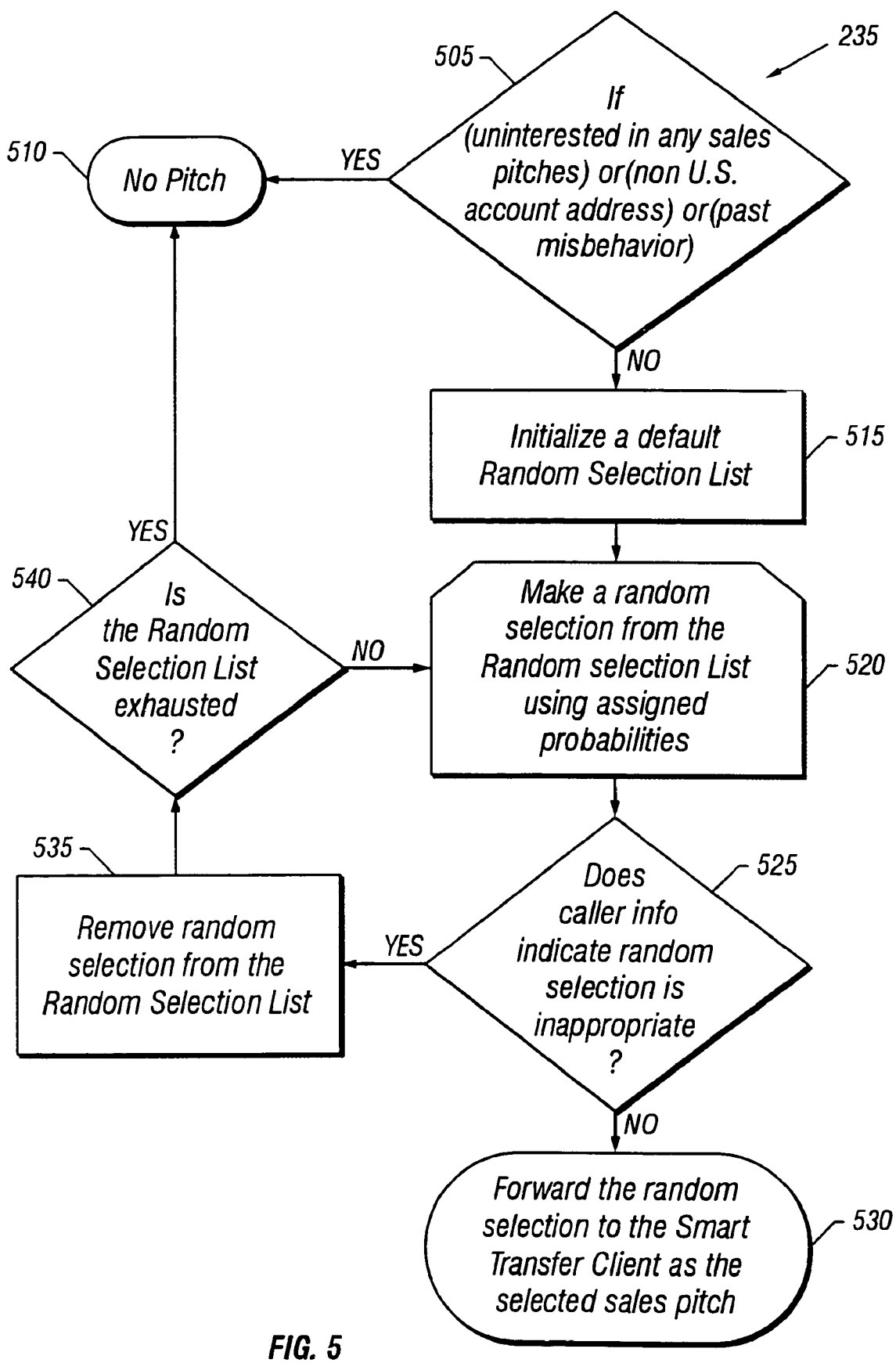
FIG. 5 is a schematic flow diagram illustrating a random selection process that may be used to select an acceptable sales pitch as provided generally in FIG. 2.
Figure 6:
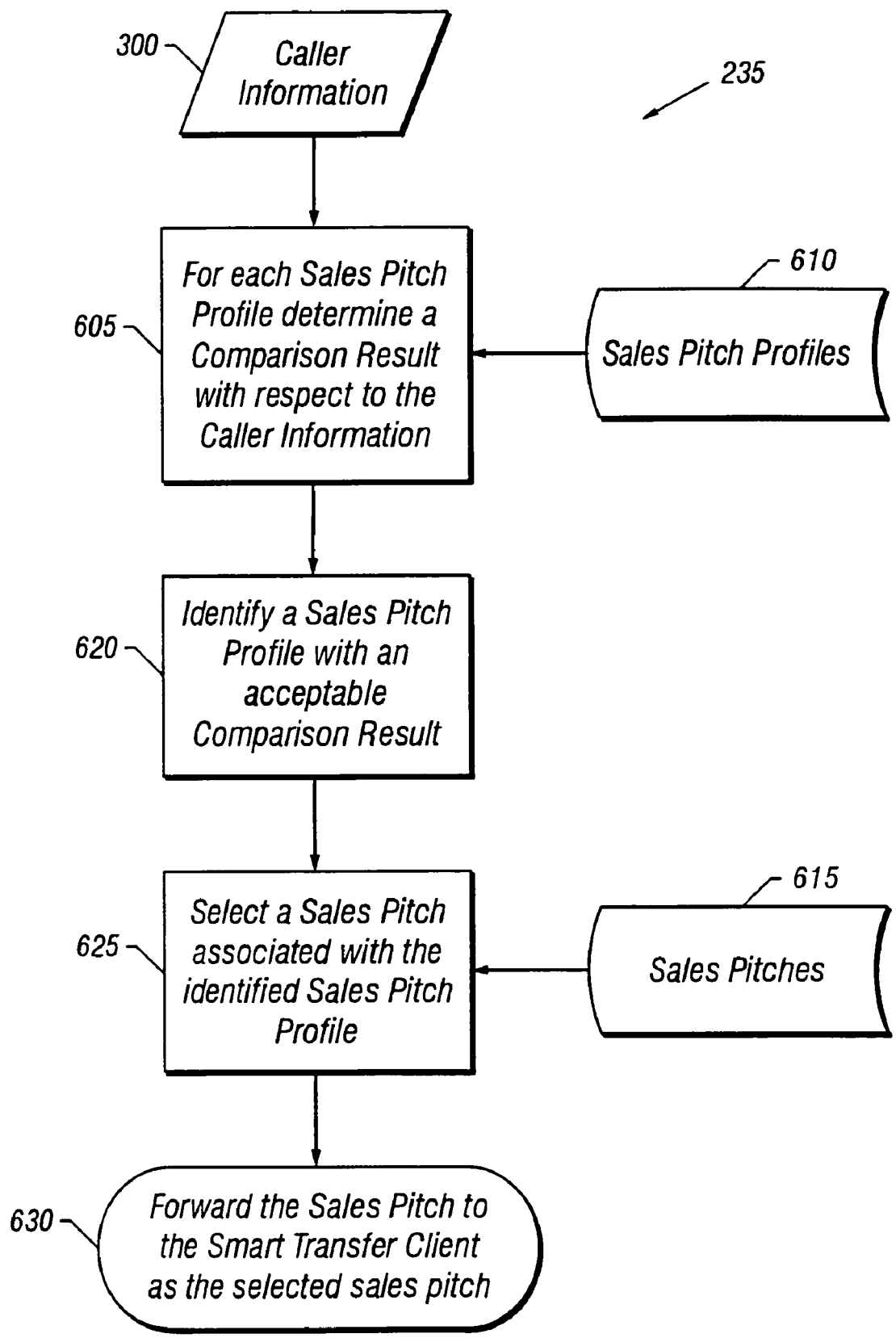
FIG. 6 is a schematic flow diagram illustrating a process of comparing caller information with sales pitch profiles to select an acceptable sales pitch as provided generally in FIG. 2.
Figure 12:
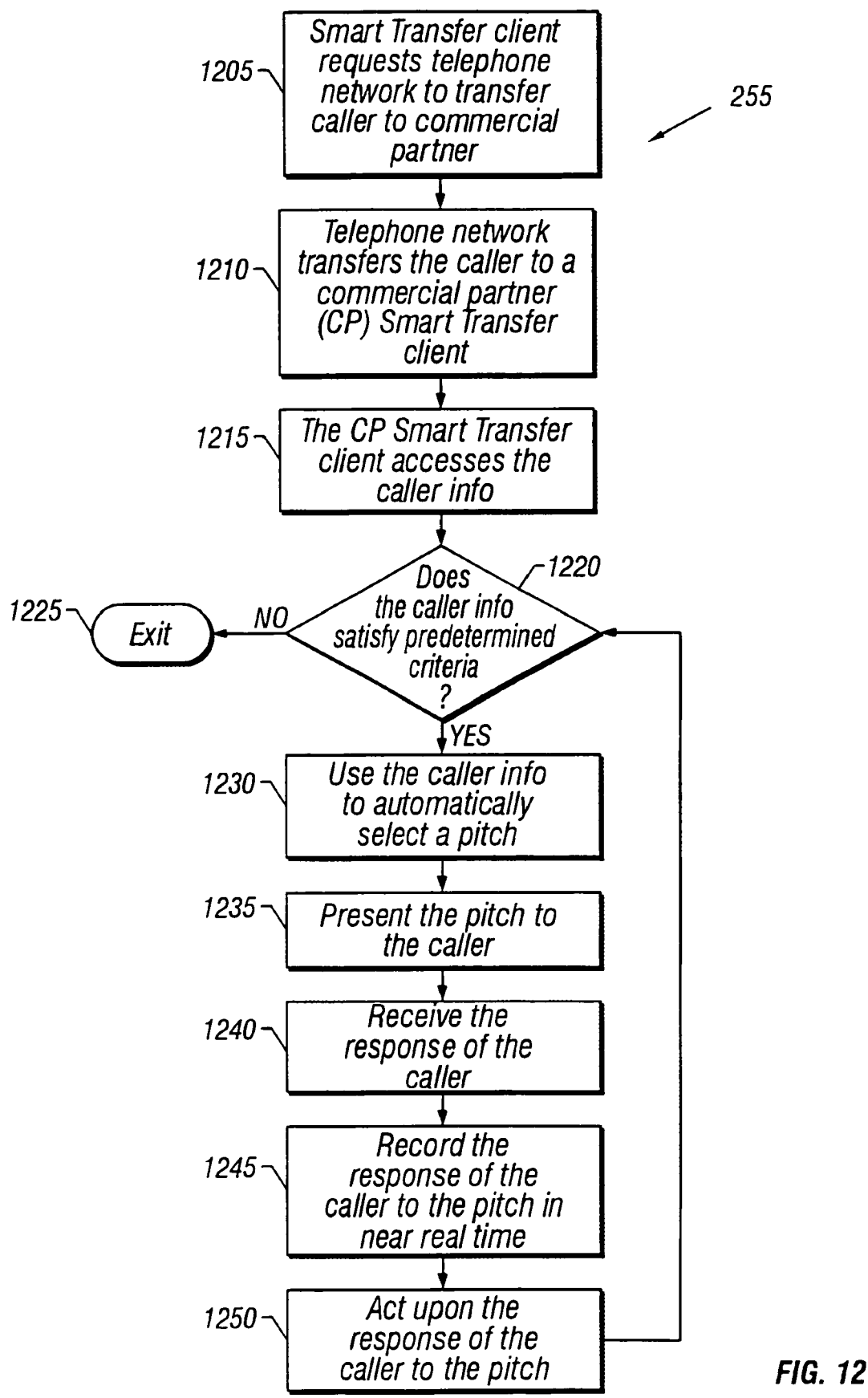
FIG. 12 is a schematic flow diagram illustrating a process for acting upon the response of a caller to the sales pitch as provided in the process of FIG. 2, where the caller's response is a positive response to an offer to transfer the caller to a commercial partner for a detailed product or service offer.

FIGS. 5 and 6 illustrate examples of a process 235 for implementing a process for using the caller information 300 to determine a sales pitch, which process 235 also may be generally applicable to step 1230 of FIG. 12. The smart transfer server 125 may use the accessed information about the caller to determine an acceptable sales pitch by, for example, performing a random sales pitch selection as discussed in relation to FIG. 5, or by performing a comparison to sales pitch profiles as discussed in relation to FIG. 6. It also is possible that the smart transfer server 125 will not access information about the caller, for example, where no data is available about the caller. In such a situation, the first sales pitch may include an offer to subscribe to a default or basic service or product.

Referring to FIG. 5, one process for determining an acceptable sales pitch is described as the random selection process 235. When the caller information 300 indicates that the caller 101 does not wish to receive any sales pitches, that the caller 101 is located outside of, for example, the United States of America, and/or that the caller has misbehaved (step 505), no pitch may be presented to the caller (step 510). Otherwise, a default random selection list may be initialized to list all available sales pitches and an initial probability distribution may be assigned to the random selection list (step 515). For example, a uniform probability distribution may be assigned such that an equal likelihood of selection exists for each sales pitch of the random selection list. Alternatively, a non-uniform probability distribution may be assigned such that certain sales pitches or groups of sales pitches have a greater or lesser likelihood of selection from the random selection list (this also is illustrated with respect to FIG. 10). For example, a probability distribution may be assigned to the random selection list to provide that internal sales pitches will be selected 25% of the time, that sales pitches corresponding to commercial partner A will be selected 35% of the time, that sales pitches corresponding to commercial partner B will be selected 30% of the time, and that sales pitches corresponding to commercial partner C will be selected 10% of the time. In like manner, a uniform or non-uniform probability distribution also may be assigned to the sales pitches associated with commercial partner A. Following initialization, a random selection is made from the random selection list using the assigned probability distribution (step 520).

The random selection is compared to the information about the caller (step 525). If the comparison indicates that the random selection is appropriate for the caller 101 (step 525), then the random selection is returned as the selected sales pitch (step 530). A random selection might, for example, be deemed inappropriate for the caller 101 where the random selection is related to an offer of commercial partner A and the caller information indicates a caller preference to not receive sales pitches related to offers of commercial partner A. The random selection also might be inappropriate for the caller where the random selection is related to an offer of commercial partner A and the caller currently is enrolled in a product of commercial partner B, a competitor of commercial partner A. If the comparison indicates that the random selection is inappropriate (step 525), then the random selection list is modified to prevent repeat selection of the inappropriate random selection (step 535). The list also may be modified to prevent the random selection of other similarly inappropriate sales pitches. For example, all sales pitches related to offers of commercial partner A may be eliminated from selection when one sales pitch is determined inappropriate because of its relation to offers of commercial partner A. Following modification of the random selection list (step 535), another random selection may be made (step 520) if the random selection list is not exhausted of available sales pitches (step 540). The process may be repeated until a qualified random selection is returned to the smart transfer client 155 as a selected sales pitch (step 530), or until the random selection list is exhausted and the sales pitch selection process is exited with no pitch (step 510).

Referring to FIG. 6, an alternative process 235 for determining an acceptable sales pitch produces a comparison result by comparing the caller information 300 against stored sales pitch profiles 610 that are associated with sales pitches 615 (step 605). The comparison may be performed for each sales pitch profile 610 or selected sales pitch profiles 610. Based upon the comparison results, one or more sales pitch profiles 610 with acceptable comparison results are identified (step 620), and one or more sales pitches 615 associated with the identified sales pitch profiles are selected (step 625) and returned to the smart transfer client 155 (step 630).

FIGS. 7A and 7B illustrate two different sales pitch profiles that share a common form. For ease of description, aspects of the sales pitch profile of FIG. 7A are described in detail and a description of corresponding aspects of the sales pitch profile of FIG. 7B is omitted for brevity.

Referring to FIG. 7A, a sales pitch profile 700A includes, by way of example, different match criterion 705A that correspond to data-fields 710A in the caller information 300. As part of identifying a sales pitch profile (e.g., steps 605 and 620 of FIG. 6), The smart transfer server 125 compares the caller information 300 that is accessed in the caller information data-fields 710A against the respective match criteria 705A of the sales pitch profile 700A. An example of results 71 5A of the comparison is shown in the far right hand column of the table of FIG. 7A.

For example, the caller information data-field "method of payment" 720A may have an associated match criterion 725A indicating acceptance of a credit card as the method of payment. The caller information 730A accessed in the method of payment data-field 720A also shows that a credit card is the method of payment of the caller. Hence, the match criterion 725A is satisfied and a match is indicated 735A. By contrast, referring to FIG. 7B, the match criterion 725B requires a check as the method of payment. The caller information 730B accessed in the method of payment data field 720B shows "credit card" to be the caller's method of payment such that the match criterion 725B is not satisfied and the unsatisfactory result is indicated 735B.

A sales pitch profile 610 may completely match the caller information (not shown). However, in FIGS. 7A and 7B, only a partial match is achieved as shown in the data-field by data-field match fields 715A, 715B. Alternatively, there also may be a complete failure to match (not shown).

In one implementation (not shown), the caller information is used by the smart transfer server 125 to identify a completely matching sales pitch profile 610. In this implementation, the sales pitch profiles 610 are configured such that one and only one sales pitch profile 610 provides a complete match relative to the caller information 300. In a simplified example, the universe of possible callers may be divided by two sales pitch profiles into those whose method of payment is by credit card and those whose method of payment is by some other means. Thus configured, one, and only one, of the two sales pitch profiles may be satisfied, i.e., any match is an exclusive match.

In general, however, sales pitch profiles 610 need not be configured to ensure exclusive matches. The sales pitch profiles 700A and 700B of FIGS. 7A and 7B are examples of profiles in which any match tends to be a matter of degree. In such an arrangement, a sales pitch profile 610 may be selected for a caller 101 through some mathematical comparison of, for example, various comparison results. A numerical value, also known as the profile correlation value, may be reduced from the match criteria, comparison results, or other criteria to enable such comparison.

Referring again to FIG. 6, a comparison result may include a profile correlation value that may be determined with respect to the caller information for each sales pitch profile (step 605). A sales pitch profile 610 with an acceptable, and perhaps best, profile correlation value is identified and used to identify a sales pitch 615 associated with the sales pitch profile 610 (step 620). A profile correlation value provides an indirect metric of the acceptability of a particular sales pitch 615 for presentation to the caller 101.

Referring to FIG. 8, the profile correlation value 805 may include a summation of weighted match values 810, where each match criterion 815 is used to produce an associated match value 820. The weighted match values 810, in turn, may include the result of the multiplication of a criterion weight 825 associated with a match criterion 815 by a match value 820 that may be "1" where the match criterion 815 is satisfied or by a number that may be "−1" where the match criterion 815 is not satisfied, for example. Also, a zero may be used for a criterion weight 825 when a match criterion 815 always will be satisfied because it is configured to include all possible callers, for example, the match criteria for sex 830 and avocation 835. To illustrate, with respect to the account status field 840, the match criterion 845 is assigned a criterion weight 850 of "2". However, the match criterion 845 is not satisfied by the caller information 855 accessed in the account status field 840. Therefore, the criterion weight 850 is multiplied by a match 860 value of "−1" to produce a weighted match value 865 of "−2". By contrast, with respect to the account type field 870, the match criterion 875 is assigned a criterion weight 880 of "1" and the match criterion 875 is satisfied by the caller information 883 accessed in the account type field 870. Therefore, the criterion weight 880 is multiplied by a match value 885 of "1" to produce a weighted match value 890 of "1". Furthermore, with respect to the avocation field 891, the match criteria 835 is specified as "any" such that a criteria weight 892 of zero is used to arrive at a weighted match value 893 of zero. A similar process is followed to arrive at a weighted match value 810 for each match criterion 815. All weighted match values 810 are then summed to arrive at a profile correlation value 805 of "−27."

The described weighting process of FIG. 8 provides a mechanism to emphasize one or more certain match criterion deemed important relative to other match criterion. Moreover, it may be desirable that the magnitude of a weighted match value differ depending upon whether a match was determined to exist. For example, it may be desirable that an appropriate weighted match value dominate a profile correlation value when a caller 101 is indicated as preferring to receive no sales pitches and/or has a history of misbehavior. However, when a caller 101 is indicated as having no preference regarding sales pitches, and/or has no history of misbehavior, it is unlikely to be equally desirable that the appropriate weighted match value dominate the final profile correlation value. Examining caller preference by way of illustration, the match value 894 corresponding to a failed match for the caller preference data-field 895 may be set at an appropriate scaling value, such as, for example, "−1", in combination with a high value, such as, for example, "20", for the corresponding criterion weight 896 to produce a weighted match value 897 of "−20" designed to have a dominating effect upon the profile correlation value 805. It may be desirable to avoid a similar dominating effect when the caller 101 prefers to receive at least some sales pitches. In that case, the match value 894 may be assigned an appropriate scaling value such as, for example, zero or a very small positive non-zero value (not shown).

Figures 9, 11:
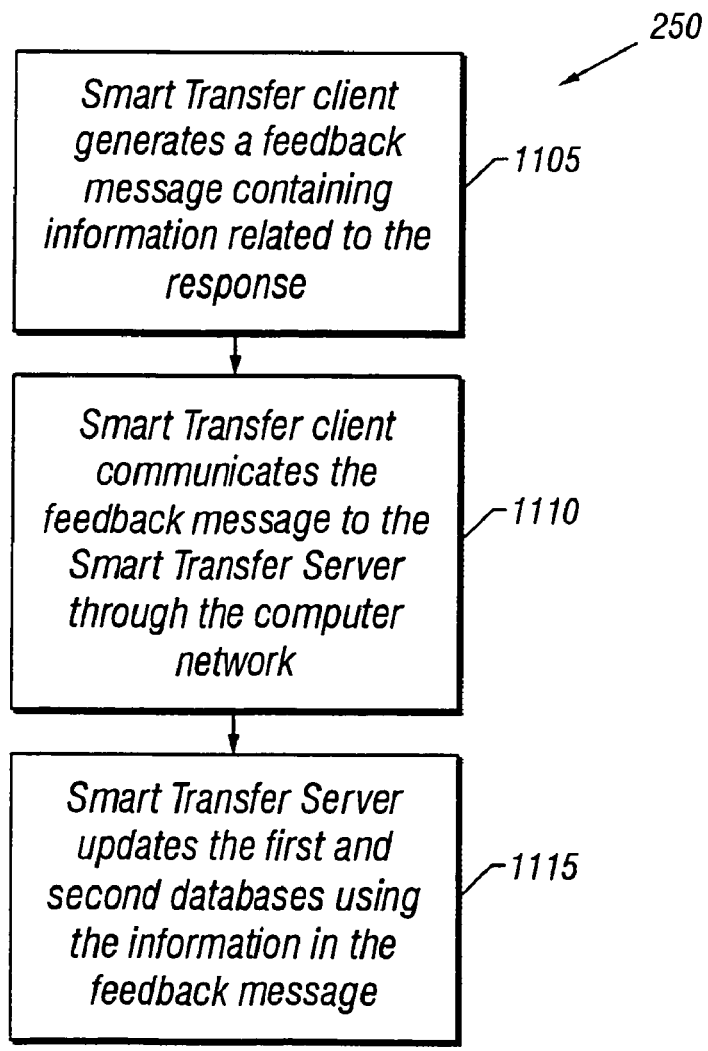
FIG. 9 is a table illustrating a sales pitch look-up table that may be used in implementing the process of FIG. 6.
FIG. 11 is a schematic flow diagram illustrating a process of recording the response of a caller to a sales pitch as provided in the process of FIG. 2.

Once a sales pitch profile is identified, the sales pitch profile may be used to index a sales pitch look-up table 900, as shown in FIG. 9, that associates sales pitches 615 with the sales pitch profiles 610.

FIG. 10 illustrates five sales pitches 1005, 1010, 1015, 1020, and 1025 that may be accessed using the sales pitch look-up table of FIG. 9. The five sales pitches generally are similar. Sales pitch 1005 is a sales pitch used to pitch a product or service offered by the pitch presenter. The sales pitches 1010, 1015, 1020, and 1025 are used to pitch the products or services of commercial partners (e.g., partner A, partner B, partner C).

FIG. 11 illustrates a process 250 for recording the response of the caller to the sales pitch, which process 250 also may be generally applicable to step 1245 of FIG. 12. After receiving the response of the caller, the smart transfer client 155 may generate a feedback message containing information related to the response of the caller (step 1105). The smart transfer client 155 then may communicate the feedback message to the smart transfer server 125 through the network 120 (step 1110). The smart transfer server 125 may update the first and second databases 130 and 140 using the information in the feedback message (step 1115).

FIG. 12 illustrates, by way of example, a process 255 for acting upon a positive response of the caller to such a sales pitch. The particular course taken in acting upon the response of a caller to a sales pitch may depend upon the nature of the sales pitch presented to the caller. For example, a sales pitch may include an offer to sell a product or provide a service. The offeror may act upon the response of the caller by signing up the caller 101 for the product or service where the caller's response indicates interest in the product or service. Where the caller 101 expresses a lack of interest in the product or service, no substantive action may be taken. A sales pitch also may include an offer to transfer the caller 101 to a commercial partner for a detailed offer about a product or service offered by the commercial partner (referred to hereinafter as a transfer sales pitch).

Initially, the smart transfer client 155 of the first call center 105 requests the telephone network 115 to transfer an incoming call to a smart transfer client 112 of the commercial partner 110 (CP smart transfer client) (step 1205). Upon receiving the transfer request, the telephone network 115 transfers the call to the CP smart transfer client 112 (step 1210). As part of the transfer of the call, a caller information key (not shown) may be communicated from the smart transfer client 155 to the CP smart transfer client 112. The CP smart transfer client 112 may access the stored caller information that includes information regarding the transfer sales pitch (step 1215), e.g., using the caller information key. The stored information about the caller is used to determine what further action to take (step 1215). If, for example, the stored information about the caller fails to satisfy predetermined criteria (step 1220), it is possible that no sales pitch will be selected for the caller (step 1225). However, if the stored information about the caller satisfies the predetermined criteria (step 1220), the stored information about the caller may be used to automatically select a sales pitch for the caller (step 1230).

Typically, the information regarding the caller is used to select a sales pitch associated with the transfer sales pitch. The selected sales pitch may then be displayed at the call center and presented to the caller (step 1235). The call center receives a response of the caller to the sales pitch (step 1240) and information associated with the response of the caller to the sales pitch is recorded as part of the stored information about the caller (step 1245). The recording of the information associated with the response of the caller (step 1245) may occur in near real time, for example, after receiving the response of the caller (step 1240) but before the response is acted upon (step 1250) or the telephone call is terminated, or, alternatively, immediately after the response is acted upon (step 1250). This is in contrast to the delayed batching of accumulated information associated with the responses of a significant numbers of callers. After the response is acted upon, process 255 is repeated, beginning at step 1220, until the updated stored information about the caller does not satisfy the predetermined criteria such that another different pitch is not selected for the caller (step 1225).

The process 255 of FIG. 12, as described, is capable of self-referential repetition, namely recursion. For example, the commercial partner may itself present a different transfer sales pitch to the caller, making the process 255 of FIG. 12 appropriate where the caller 101 expresses interest in the different transfer sales pitch. Also, examination of FIGS. 2 and 12 reveals that steps 1220 to 1250 of FIG. 12 correspond to steps 225 to 255 of FIG. 2.

Other implementations are within the scope of the following claims.

What is claimed is:

1. A process for assisting presentation of sales pitches appropriate for a particular telephone caller of a customer service call center, the process comprising:
   receiving and handling at a customer service call center an incoming service call from a caller seeking assistance; and
   leveraging the incoming service call for assistance as a conduit for soliciting the caller to purchase merchandise or services, the leveraging including:
   identifying a caller identity or a first caller attribute related to the caller,
   storing in a first electronic database, prior to the receipt of the incoming service call from the caller, a sales pitch preference of the caller, as an additional attribute, comprising a preference of the caller not to receive any sales pitches,
   searching the first electronic database to determine the additional attribute of the caller based on at least one of the caller identity or the first caller attribute,
   omitting to search a second electronic database of potential sales pitches for a sales pitch based upon at least the additional attribute of the caller, and
   routing the service call to a human operator.

2. The process of claim 1 further comprising populating the first electronic database prior to the call with information indicative of the caller.

3. The process of claim 2 further comprising populating the first electronic database with information indicative of responses made by the caller in response to past sales pitch presentations.

4. The process of claim 2 further comprising populating at least one of the first or the second electronic database with information indicative of past misbehavior of the caller.

5. The method of claim 1 wherein storing in the first electronic database includes storing in the first electronic database, including multiple sales pitch preferences associated with multiple callers, each of the multiple sales pitch preferences corresponding to a preference not to receive any sales pitch.

6. A system for leveraging an incoming service call for assistance as a conduit to assist a human operator to solicit the caller to purchase a merchandise or service, the system comprising:
   an identification component configured to determine a caller identity related to a caller seeking assistance from a customer service call center;
   a first electronic database configured to store as an attribute related to the caller and prior to the receipt of the incoming service call from the caller, a sales pitch preference of the caller comprising a preference of the caller not to receive any sales pitches;
   a search component configured to identify in the first electronic database the attribute related to the caller based on the caller identity and configured to omit searching a second electronic database of potential sales pitches for a sales pitch based on the attribute; and
   a call router configured to route the service call to a human operator to assist the caller.

7. The system of claim 6 wherein the first electronic database is configured further to store information indicative of past misbehavior of the caller.

8. The system of claim 6 wherein the first electronic database is configured further to store information indicative of a response by the caller to a past sales pitch.

9. The system of claim 6 wherein the first electronic database is configured to store multiple sales pitch preferences associated with multiple callers, each of the multiple sales pitch preferences corresponding to a preference not to receive any sales pitch.

10. A computer program stored on a computer readable medium for leveraging an incoming service call for assistance as a conduit to assist a human operator to solicit the caller to purchase a merchandise or service, the computer program comprising:
  an identification code segment that causes the computer to determine a caller identity related to a caller seeking assistance from a customer service call center;
  a first database code segment configured to store as an attribute related to the caller and prior to the receipt of the incoming service call from the caller, a sales pitch preference of the caller comprising a preference of the caller not to receive any sales pitches;
  a search code segment that causes the computer to identify the stored attribute related to the caller based on the caller identity and to omit searching a second electronic database of potential sales pitches for a sales pitch based on the attribute; and
  a call routing code segment that causes the computer to route the service call to a human operator to assist the caller.

11. The computer program of claim 10 wherein the first database code segment further causes the computer to store information indicative of past misbehavior of the caller.

12. The computer program of claim 10 wherein the first database code segment further causes the computer to store information indicative of a response by the caller to a past sales pitch.

13. The computer program of claim 10 wherein the first database code segment is configured to store multiple sales pitch preferences associated with multiple callers, each of the multiple sales pitch preferences corresponding to a preference not to receive any sales pitch.

14. A process for assisting presentation of a first sales pitch appropriate for a particular telephone caller of a customer service call center, the process comprising:
  receiving and handling at a customer service call center an incoming service call from a caller seeking assistance; and
  leveraging the incoming service call for assistance as a conduit for soliciting the caller to purchase merchandise or services, the leveraging including:
  identifying a caller identity or a first caller attribute related to the caller,
  storing in a first electronic database, prior to the receipt of the incoming service call from the caller, information indicative of past misbehavior of the caller,
  searching the first electronic database to identify the information indicative of past misbehavior based on at least one of the caller identity or the first caller attribute,
  omitting to search the second electronic database for a potential sales pitch based on the identified information indicative of past misbehavior, wherein the identified information indicative of past misbehavior includes information that the caller has acted illegally or that the caller has violated a terms of service agreement associated with the caller's account,
  routing the service call to a human operator based on the identified information indicative of past misbehavior, and
  assisting the human operator to take the service call based on the identified information indicative of past misbehavior.

15. A system for leveraging an incoming service call for assistance as a conduit to assist a human operator to solicit the caller to purchase a merchandise or service, the system comprising:
  an identification component configured to determine a caller identity related to a caller seeking assistance from a customer service call center;
  a first electronic database configured to store, prior to receipt of the incoming service call from the caller, information indicative of past misbehavior of the caller;
  a search component configured to identify in the first electronic database the information indicative of past misbehavior based on the caller identity, wherein the information indicative of past misbehavior includes information that the caller has acted illegally or that the caller has violated a terms of service agreement associated with the caller's account;
  a call router configured to bypass a sales pitch selection process and to route the service call to a human operator based on the identified information indicative of past misbehavior; and
  a presentation component configured to assist the human operator to take the service call based on the identified information indicative of past misbehavior.

16. A computer program stored on a computer readable medium for leveraging an incoming service call for assistance as a conduit to assist a human operator to solicit the caller to purchase a merchandise or service, the computer program comprising:
  an identification code segment that causes the computer to determine a caller identity related to a caller seeking assistance from a customer service call center;
  a first database code segment configured to store, prior to receipt of the incoming service call from the caller, information indicative of past misbehavior of the caller;
  a search code segment that causes the computer to identify the information indicative of past misbehavior based on the caller identity;
  a second database code segment configured to cause the computer to identify a first sales pitch for the caller;
  a call routing code segment that causes the computer to bypass the second database code segment and to route the service call to a human operator based on the identified information indicative of past misbehavior, wherein the identified information indicative of past misbehavior includes information that the caller has acted illegally or that the caller has violated a terms of service agreement associated with the caller's account; and
  a presentation code segment that causes the computer to assist the human operator to present the service call based on the identified information indicative of past misbehavior.

17. A process for assisting presentation of a first sales pitch appropriate for a particular telephone caller of a customer service call center, the process comprising:
  receiving and handling, at a customer service call center, an incoming service call from a caller seeking assistance; and
  leveraging the incoming service call for assistance as a conduit for soliciting the caller to purchase merchandise or services, the leveraging including:
  identifying a caller identity or a first caller attribute related to the caller,
  storing a sales pitch preference in a first electronic database to be used as an additional attribute of the caller, the sales pitch preference comprising a preference of the caller not to receive a sales pitch related to a first service or product and not to receive any sales pitches related to a provider of the first service or product, searching the first electronic database to determine the additional attribute of the caller based on at least one of the caller identity and the first caller attribute, searching, based upon at least the additional attribute of the caller, a second electronic database of potential sales pitches to identify a first sales pitch that is not related to the first service or product and is not related to the provider of the first service or product, routing the service call to a human operator for presentation of the first sales pitch to the caller, and assisting the human operator in presenting the first sales pitch to the caller.

18. The process of claim 17 wherein the sales pitch preference of the caller further comprises a preference to receive a certain type of sales pitch.

19. The process of claim 17 further comprising populating the first electronic database prior to the call with information indicative of the caller.

20. The process of claim 19 further comprising populating the first electronic database with information indicative of a response by the caller to the first sales pitch.

21. The process of claim 19 further comprising populating the first electronic database with information indicative of responses made by the caller in response to past sales pitch presentations.

22. The process of claim 19 further comprising populating at least one of the first or the second electronic database with information indicative of past misbehavior of the caller.

23. The process of claim 17 further comprising searching the second electronic database for a second sales pitch for the caller immediately after the caller provides the response to the first sales pitch, wherein the first electronic database is populated with information indicative of a response by the caller to the first sales pitch prior to searching the database for the second sales pitch.

24. The process of claim 17 wherein assisting the human operator in presenting the first sales pitch comprises displaying at least a portion of the selected first sales pitch on a display of the human operator.

25. The process of claim 17 wherein the first sales pitch is identified within the second database only when at least the additional attribute of the caller indicates that the caller satisfies a predetermined criterion.

26. The process of claim 17 wherein the first caller attribute indicates a geographic residence of the caller, and identifying the first sales pitch includes making unavailable for selection one or more sales pitches of the second electronic database based upon the geographic residence of the caller.

27. The process of claim 17 wherein the additional attribute of the caller includes a credit status for the caller, and identifying the first sales pitch includes selecting the first sales pitch for the caller only when the credit status of the caller is satisfactory.

28. The process of claim 17 further comprising transferring the caller to a commercial partner that provides a product or service that corresponds to the selected first sales pitch if the caller has expressed interest in the first sales pitch.

29. The process of claim 17 further comprising communicating information related to the caller to the commercial partner substantially in real time.

30. The process of claim 29 wherein the information comprises information related to the first sales pitch presented to the caller.

31. The process of claim 17, further comprising:

transferring the caller to a commercial partner that provides a product or service that corresponds to the selected first sales pitch, wherein the commercial partner provides a second sales pitch to the caller;

receiving feedback information from the commercial partner regarding a response by the caller to the second sales pitch; and populating the first electronic database with information indicative of the response by the caller to the second sales pitch.

* * * * *